United States Patent [19]

Cupolo et al.

[11] Patent Number: 4,917,967
[45] Date of Patent: Apr. 17, 1990

[54] MULTIPLE-LAYERED ARTICLE AND METHOD OF MAKING SAME

[75] Inventors: Dennis A. Cupolo, Suffern; Geoffrey P. Fonseca, Pomona, both of N.Y.; Fernando Fernandez, Raimey Base, P.R.; Jean Greenbaum, New York; Jeffrey M. Brown, Suffern, both of N.Y.

[73] Assignee: Avon Products, Inc., New York, N.Y.

[21] Appl. No.: 296,594

[22] Filed: Jan. 13, 1989

[51] Int. Cl.$^4$ ............................................. B32B 15/00
[52] U.S. Cl. .................................. 428/669; 428/670; 428/672; 428/673; 428/935
[58] Field of Search ............... 428/669, 670, 671, 672, 428/673, 674, 675, 677, 935

[56] References Cited

U.S. PATENT DOCUMENTS

| | | | |
|---|---|---|---|
| 1,001,669 | 8/1911 | Monnot | 428/669 |
| 2,608,753 | 9/1952 | Mooradian | 428/671 |
| 2,646,616 | 7/1953 | Davignon | 428/669 |
| 3,162,512 | 12/1964 | Robinson | 428/672 |
| 3,607,150 | 9/1971 | McGinn | 428/672 |
| 3,778,238 | 12/1973 | Tyler | 428/672 |
| 3,953,246 | 4/1976 | Wilson et al. | 428/672 |
| 4,579,761 | 4/1986 | Ruscoe et al. | 428/658 |

FOREIGN PATENT DOCUMENTS 58-61296  4/1983  Japan ............................ 204/35

Primary Examiner—John J. Zimmerman
Attorney, Agent, or Firm—S. Michael Bender

[57] ABSTRACT

A multiple-layered metallic article useful for example, as costume jewelry having an intermediate "brightening layer" of bronze. A barrier layer selected from the group comprising palladium, tin, tin/zinc, rhodium, or platinum is disposed between the bronze "brightening layer" and a "top coat" layer to avoid migration of the copper component in the bronze layer to the outer surface of the article which, if left unimpeded eventually would result in a tarnishing effect to the article. As a result of the bronze intermediate layer, the article is hypo-allergenic with respect to those people having a skin sensitivity to nickel-plated or nickel-underplated metallic articles.

4 Claims, 1 Drawing Sheet

MULTIPLE-LAYERED ARTICLE AND METHOD OF MAKING SAME

TECHNICAL FIELD

The present invention relates generally to multiple-layered metallic articles, and more specifically to a novel multiple-layered metallic article formed by electrically depositing or electroplating a succession of different metals or metal alloys to form a useful article, such as for example, an article of costume jewelry, and to a unique method of making such articles.

BACKGROUND ART

In the manufacture of useful multiple-layered metallic articles such as costume jewelry, for example, it is common to first form a base metal, usually tin or brass, into a desired shape as by stamping or casting, and then by the well known and understood technique of electrode position or electroplating, applying layers of metal or metal alloy to form the finished piece. Usually a layer of copper is applied first over the base metal to give the piece ductility and provide a good adhering surface for the plating of a subsequent layer or layers of material. Next, a corrosion-resistant layer of nickel frequently referred to as a "brightening layer" is applied over the copper layer, and then finally, followed by a "top coat" or outer layer of precious metal such as gold or silver. A significant disadvantage of the well known method just described is that the ions from the nickel layer migrate to the "top coat" surface causing many consumers who purchase and wear such costume jewelry to suffer adverse allergic reactions, i.e. it is well known that many people have skin that is sensitive to nickel. Thus, it is not uncommon for such "sensitive" consumers to break out with skin irritation, itching, reddening or flaking of the skin in the region where the costume jewelry comes into contact with the wearer, e.g. the ear lobe region in the case of earrings.

DISCLOSURE OF THE INVENTION

Against the foregoing background, the present invention, briefly described, contemplates a unique multiple-layered article useful, for example, as costume jewelry where the intermediate layer of nickel is dispensed with in favor of a layer of bronze. Such articles have been found to be "hypo-allergenic" with regard to "sensitive skin" people susceptible to reacting allergically to the presence of nickel in costume jewelry. The present invention further contemplates a barrier layer selected from the group comprising palladium, tin, tin/zinc, platinum, or rhodium which barrier layer, in accordance with the invention, is disposed via electroplating over the bronze intermediate layer to avoid migration of the copper component in the bronze intermediate layer which, if left unimpeded, eventually would result in a tarnishing effect to the article. Thus, in accordance with the invention, there is provided a multiple-layered article for use as costume jewelry where the jewelry piece not only is "hypo-allergenic," but moreover, it is not susceptible to being tarnished after long periods of wear.

BRIEF DESCRIPTION OF THE DRAWINGS

The above and further advantages and objects of the invention will be made more apparent by a study of the following detailed description of the preferred mode of carrying out the invention in connection with the accompanying drawings wherein.

BEST MODE FOR CARRYING OUT THE INVENTION

Figure 1:
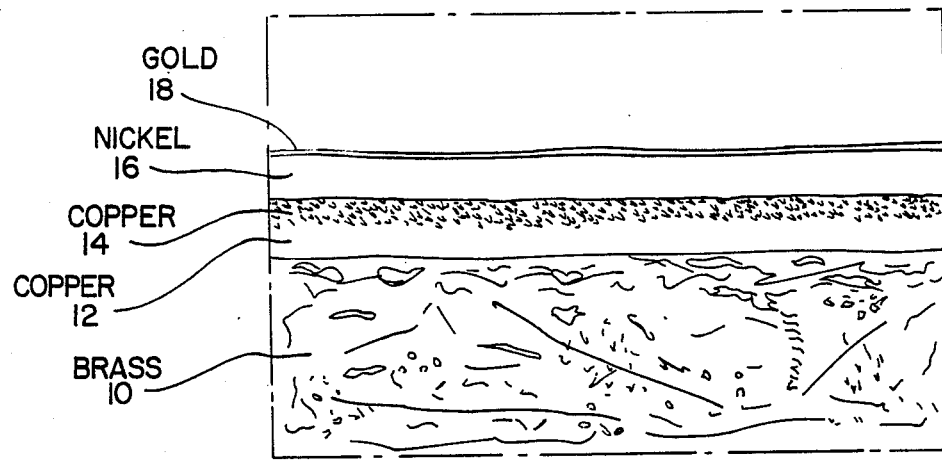
FIG. 1 is an artist's rendition of a photomicrograph (enlarged 1000×) depicting a partial cross-section of a multiple-layered article made by the prior art method.

Turning initially to FIG. 1, there is shown an artist's rendition of a photomicrograph schematically depicting a partial cross-section of the prior art multiple-layered article enlarged 1000× comprising a first base metal layer or substrate 10 of a conventional brass alloy having a thickness of about 50 mils (0.050 inches). The substrate 10 preferably is formed into a desired shape by stamping or casting in a well known manner. Thus, for example, the substrate 10 may be formed into an ornamental shape suitable for use as an earring or other item of costume jewelry. The term "costume jewelry" as used herein means an article of jewelry that lacks a substantial content of precious metal, e.g. gold, silver, platinum, and so on, and therefore is relatively inexpensive.

The surface of substrate 10 is relatively rough and pitted and not suitable for directly receiving an electroplated final or top layer of material. Accordingly, a first intermediate layer of copper 12 is applied to substrate 10 by electroplating in a bath of copper cyanide (CuCn) electrolytic solution. The resulting layer of cyanide copper 12 then serves as a surface to receive a second intermediate layer of copper 14, applied via electroplating in a bath of copper sulfate ($CuSO_4$) solution. Layer 14 which may be referred to as the acid copper layer, gives the workpiece the desired degree of ductility and provides an excellent surface for receiving the so-called "brightening layer" 16 of nickel or nickel alloy which subsequently is applied in a nickel sulfate ($NiSO_4$)-/nickel chloride ($NiCl_2$) electrolytic solution or bath. Nickel layer 16 provides a relatively smooth and flat surface for the final layer or top coat of precious metal 18, for example, gold, applied in an electrobath of gold cyanide ($AnCn_4$) solution. As a result of the relatively smooth and flat undersurface afforded by nickel layer 16, the "top coat" of gold appears extremely bright and shiny to the eye of an observer giving the workpiece a desirable and pleasing aesthetic appearance. It is for this reason that the nickel layer 16 is referred to as the "brightening layer." In addition, nickel layer 16 acts to prevent corrosion of the copper and base metal underlayers further giving the workpiece the ability to withstand long periods of wear without tarnishing.

Generally, for a workpiece useful as an article of costume jewelry, the thickness of the cyanide copper layer 12 will be in the range of 40-80 micro inches (1 micro inch equals 0.000001 inches), the thickness of the acid copper layer 14 will be in the range of 180-220 micro inches, the thickness of the nickel "brightening layer" 16 will be in the range of 150-200 micro inches, and the thickness of the "top coat" 18 of precious metal will be in the range of 1-5 micro inches, with the thickness of each layer being varied by maintaining the workpiece in the corresponding electrobath for greater or lesser periods of time as desired, and as is well known in the art of electroplating.

In the prior art multiple-layered article just described, often referred to as a "nickel plated" or "nickel underplated" item, nickel ions from the "brightening layer" 16 tend to migrate to the outer surface of the relatively thin top coat 18 whereupon they come into contact with skin of the wearer of the article (assuming it to be an article of costume jewelry). In substantial numbers of consumers wearing such articles, a skin sensitivity to nickel results in an allergic reaction manifested by irritation, itching, reddening, flaking, or even serious skin lesions or infection.

In accordance with the present invention, such prior art multiple-layered articles are rendered "hypo-allergenic" by removing the nickel brightening layer and substituting instead a layer of bronze, (i.e. an alloy of copper and tin). In order to prevent the copper component in the bronze underlayer from migrating to the outer surface of the "top coat" layer, a barrier layer of metal or metal alloy selected from the group consisting of palladium, tin, tin/zinc platinum, or rhodium, is employed. As a result, there is produced, in accordance with this invention, multiple-layered metallic articles especially useful in fabricating or being used as costume jewelry, which articles not only are "hypoallergenic," but moreover, they are not susceptible to tarnishing even after long periods of wear. The term "hypo-allergenic" as used herein means that substantially less skin reactions result or are likely to result among "skin sensitive" consumers wearing multiple-layered articles made in accordance with the present invention.

Figure 2:
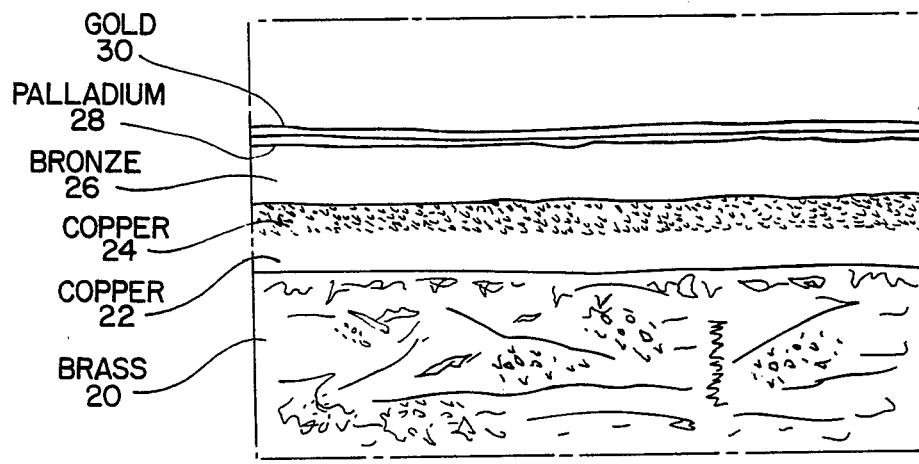
FIG. 2 is an artist's rendition of a photomicrograph (enlarged 1000×) depicting a partial cross-section of a preferred embodiment of multiple-layered article made in accordance with the present invention.

Thus, turning now to FIG. 2, there is shown an artist's rendition of a portion of a cross-section of a preferred form of multiple-layered article according to invention, enlarged 1000×. A base metal or substrate 20 of brass (i.e. an alloy of copper and zinc) is stamped or cast in a desired shape so as to have a desired ornamental shape (not shown) rendering the workpiece suitable for use as an article of costume jewelry, preferably an earring. A first intermediate layer 22 of cyanide copper is applied over base metal layer 20 by electroplating the workpiece in an electrolytic bath of copper cyanide (CuCn). A second intermediate layer 24 is electrodeposited in essentially the same manner over the first layer 22 in an electrolytic solution of copper sulfate ($CuSO_4$) Thus far, the multiple-layered article of FIG. 2 is quite similar to the prior art multiple-layered article of FIG. 1. However, in accordance with the invention, instead of a "brightening layer" of nickel, there is deposited over the second intermediate (cyanide copper) layer 24, via electroplating in an electrolytic solution of chelated copper and tin, a layer 26 of bronze (i.e. an alloy of copper and tin or copper, tin and zinc).

In accordance with another important feature of the present invention, a barrier layer 28 is then electroplated over the bronze "brightening layer" in a suitable electrolytic solution with the barrier layer being relatively thin vis-a-vis the bronze layer. The purpose of the barrier layer is to prevent any solid phase migration of copper from the bronze layer to the outer surface of the workpiece which if left unimpeded would ultimately result in tarnishing of the workpiece, i.e. the copper would oxidize on the outer surface. In addition, the barrier layer itself should also be resistant to tarnishing. Suitable metals or metal alloys meeting these requirements and therefore suitable as a barrier layer electroplate in accordance with the present invention comprise palladium, tin, tin/zinc, rhodium and platinum, with palladium being particularly preferred because it is relatively easy to handle and control during plating, has excellent tarnish resistant characteristics, and is relatively inexpensive. When palladium is employed as the particularly preferred barrier layer 28, it may be electroplated over the bronze "brightening" layer 26 by immersing the workpiece in an electrolytic solution or bath comprising palladium chloride ($PdCl_2$).

In preferred embodiments of multiple-layered metallic articles according to the invention and useful as articles of costume jewelry, the bronze layer 26 may have a thickness in the range of 50–225 micro inches as viewed along a vertical axis in FIG. 2, whereas the barrier layer 28 may have a thickness in the range of 5–20 micro inches, the precise thickness being dependent upon such factors as wear characteristics, brightness (smoothness) and cost and being determined by the correlative periods of time the workpiece is maintained in its corresponding electrobath during the applicable electroplating process.

Lastly, a relatively thin "top coat" or final layer 30 of precious metal such as gold or silver, for example, may be deposited or electroplated over the barrier layer 28 to produce the finished workpiece depending upon the look (appearance) desired. Generally, top coat 30 will merely consists of a "strike" or flash" of precious metal, i.e. a layer having a thickness of 1–5 micro inches. Alternatively, the barrier layer 28 itself may serve as the top coat particularly when the barrier layer is selected from the same metal used as the final finish. For example, in certain situations it may be deemed desirable to finish the rhodium or platinum "strike" or "flash." In such cases, a single layer of such precious metal having a thickness in the range of 5–20 micro inches may suffice instead as both the barrier layer 28 and the top coat or final layer 30.

To further illustrate the present invention, the reader's attention is directed to the following examples which are not to be construed as limiting.

EXAMPLE 1

Three separate groups of earrings were made as follows. A series of low-lead brass (85% Cu/15% Zn) stampings were fabricated in a "wave" design on a 20 ton stamping press. After cleaning in a Bransonic Ultrasonic cleaner, the samples were racked and immersed in an electrobath containing copper cyanide solution for about 30 seconds to form an 80 micro inch copper plate. The rack was then dip rinsed in de-ionized water and immersed in a second electrobath containing copper sulfate solution (CUBATH from Oxy Metal Industries) for about 10 minutes to obtain a second copper plate of 200 micro inches. The rack was rinsed again and then immersed in a third electrobath containing chelated copper and tin (BRONZEX 2 from Oxy Metal Industries) for about 12 minutes to obtain a bronze "brightening" plate of 200 micro inches. After rinsing, the workpieces were divided and reracked onto 3 separate racks, each rack then being immersed sequentially in a palladium chloride electrobath (DECOREX 2 from Oxy Metal Industries) for periods of 15 seconds, 60 seconds, and 120 seconds, respectively, to produce three groups of earring samples having a palladium barrier plate thickness of 1 micro inch (Flash), 5 micro inches, and 10 micro inches, respectively. The 3 groups were rinsed again and simultaneously immersed in a gold cyanide electrobath (SEL-REX 2200 from Oxy Metal Industries) for 30 seconds to produce a 3 micro inch "flash" of gold as a top coat or final plate. The 3 separate groups characterized respectively by a different thickness of barrier plate were labeled BF ("Flash" 1 micro inch), B5 (5 micro inches) and B10 (10 micro inches), and subjected to artificial perspiration (3% sodium chloride, ½% lactic acid, ½% urea, Q.S. $H_2O$) for 24 hours, hydrogen sulfide fumes ($H_2S$) for 30 minutes, 90% relative humidity for 2 weeks, and high sulfur containing pads (100 ppm) at a temperature of 100° F. for 5 days, to encourage tarnishing. The results of this test are tabulated in Table I below.

TABLE I

| SAMPLE | PERSPIRATION | H2S | HUMIDITY | ELEV. TEMP/SULFUR |
|---|---|---|---|---|
| BF | SL TARNISH | Sl TARNISH | SL TARNISH | SL TARNISH |
| B5 | NO TARNISH | NO TARNISH | NO TARNISH | NO TARNISH |
| B10 | NO TARNISH | NO TARNISH | NO TARNISH | NO TARNISH |

The testing of this Example 1 demonstrates that palladium at 5 to 10 micro inches is an effective barrier to prevent copper migration and associated tarnish. Flash levels (i.e. less than about 5 micro inches) of palladium reduced the tarnish seen in the test, but did not completely eliminate it.

EXAMPLE 2

Two different groups of earrings using the brass stampings of Example 1 were electroplated as follows.

| Control | Test |
|---|---|
| Copper underplate (acid and cyanide) 200 micro inches | Copper Underplate (acid and cyanide) 200 micro inches |
| Nickel 200 micro inches | Bronze 200 micro inches |
| Gold "top coat" 3 micro inches | Gold "top coat" 3 micro inches |

Thirty females with a known history of skin sensitivity participated in an 8 week sequential monadic home use evaluation. For the first 4 weeks, half the panel received a bronze underplated sample whereas the remaining half received the nickel underplated sample. For the second 4 weeks of the test, each tester "crossed over" and received the opposite sample; thus, each tester wore each pair of earrings (i.e. the "Test" and the "Control") for 4 weeks or a minimum of 200 hours. Each tester was required to notify the test coordinator immediately if any problems were experienced or if that tester did not wish to continue testing the item. Upon receiving each report, the panelists' ears were examined for visible irritation and told to continue wearing the earrings as long as desired.

With respect to the BRONZE UNDERPLATED OR TEST SAMPLES, only 2 of the 30 testers reported any reactions whatsoever. Both testers experienced slight itching after 8-9 hours of wear. No visible signs of irritation were observed. These testers continued to wear the earrings for a total of 18 and 91 hours, respectively.

With respect to the NICKEL UNDERPLATED OR CONTROL SAMPLES, 9 of the 30 testers reported reactions. One tester discontinued wearing the earrings after 3 hours due to severe perceived itching. Four testers experienced itching after 8-12 hours of wear, however, continued to wear the earrings for a total of 184, 60, 44, and 90 hours, respectively. Another tester felt soreness after 8 hours of wear, but continued to wear the earrings for a total 170 hours, finally removing the earrings when the soreness became unbearable. Two other testers who wore the earrings for 90 and 60 hours, respectively, reported slight bleeding when the earrings were removed. Finally, one other tester experienced itching 2 hours after putting on the earrings. After cleaning her ears with peroxide, she wore the earrings for an additional 40 hours after which the irritation returned and the tester stopped wearing the earrings. Three weeks later, the tester informed the test coordinator that her ears were swollen, red and had developed crusting.

Based upon the foregoing experiences, the BRONZE UNDERPLATED OR TEST SAMPLES proved to be hypo-allergenic. In addition, a significant portion of the panel agreed through questionnaires that the bronze underplate earrings were perceived to be hypoallergenic.

The terms "electrodeposit" and "electroplate" are used synonomously in the above specification and appended claims and mean the process whereby an object, usually metallic, is coated with one or more relatively thin, tightly adherent layers of some other metal or metal alloy. Electroplating is usually specified when there is a need for surface characteristics that the basis metal, selected for cost or structural reasons, does not possess.

Having described our invention as required by statute, it is desired that the present invention be limited only by the true spirit and scope of the appended claims.

We claim:

1. A multiple-layered metallic article comprising a first layer of base metal, an intermediate layer of bronze electroplated on said base metal layer, an outer layer of precious metal selected from gold, silver, palladium, rhodium or platinum electroplated on said intermediate layer, and a barrier layer selected from palladium, between said intermediate layer and said outer layer, said outer layer being relatively thin compared to the thickness of said intermediate layer and said first layer and having a thickness in the range of about 1 to about 5 microinches, wherein said metallic article is useful as an article of costume jewelry and is hypoallergenic with respect to people having skin sensitive to nickel.

2. The invention of claim 1 wherein the thickness of said barrier layer is at least 5 micro inches.

3. The invention of claim 2 wherein the thickness of said barrier layer is in the range of 5 micro inches to 20 micro inches.

4. The invention of claims 1, 2 or 3 further comprising a layer of copper disposed between said base metal layer and said intermediate layer.

* * * * *